Oct. 16, 1928.
P. A. ORTON
1,688,129
FRICTION CLUTCH TRANSMISSION
Filed April 19, 1926
3 Sheets-Sheet 2
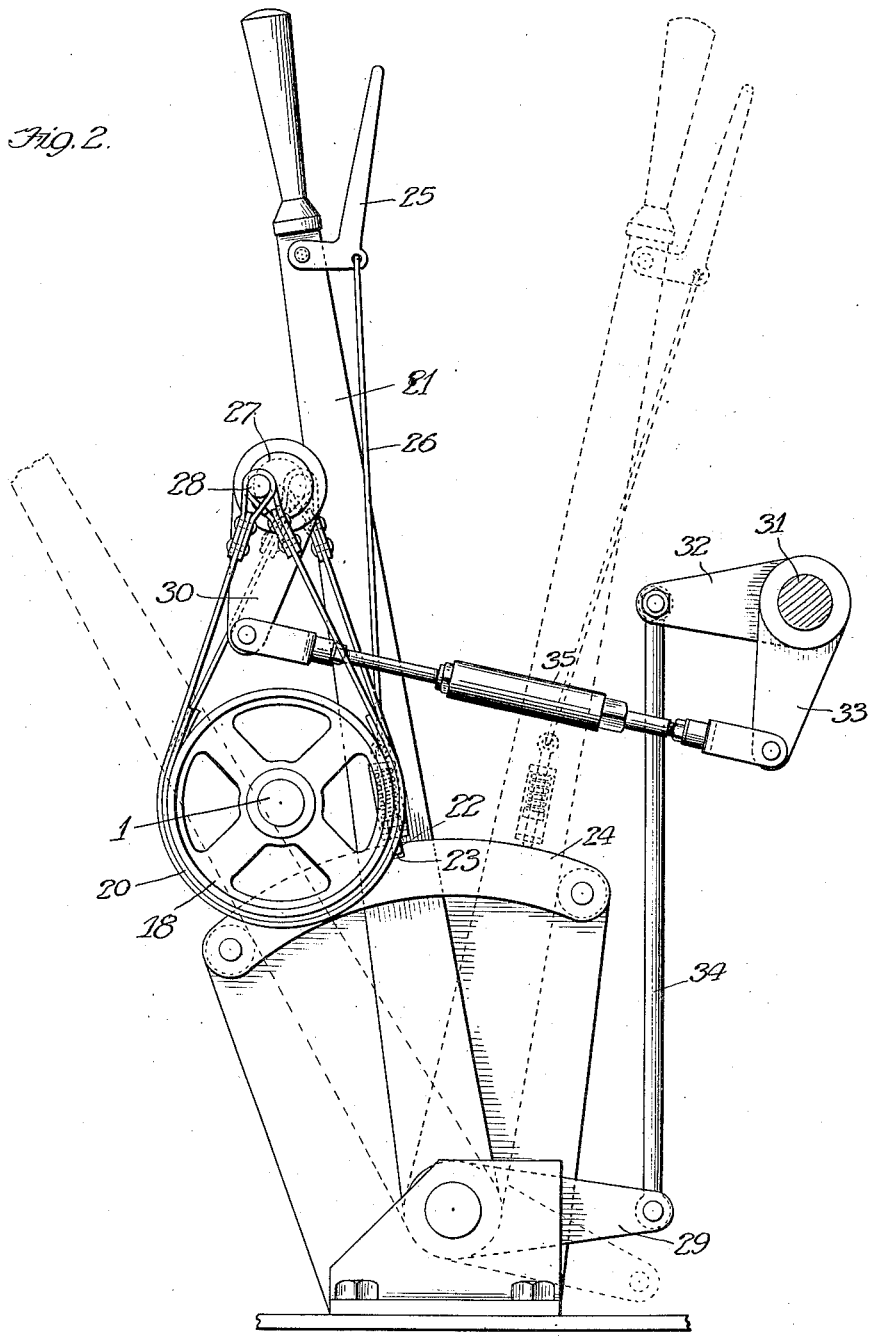

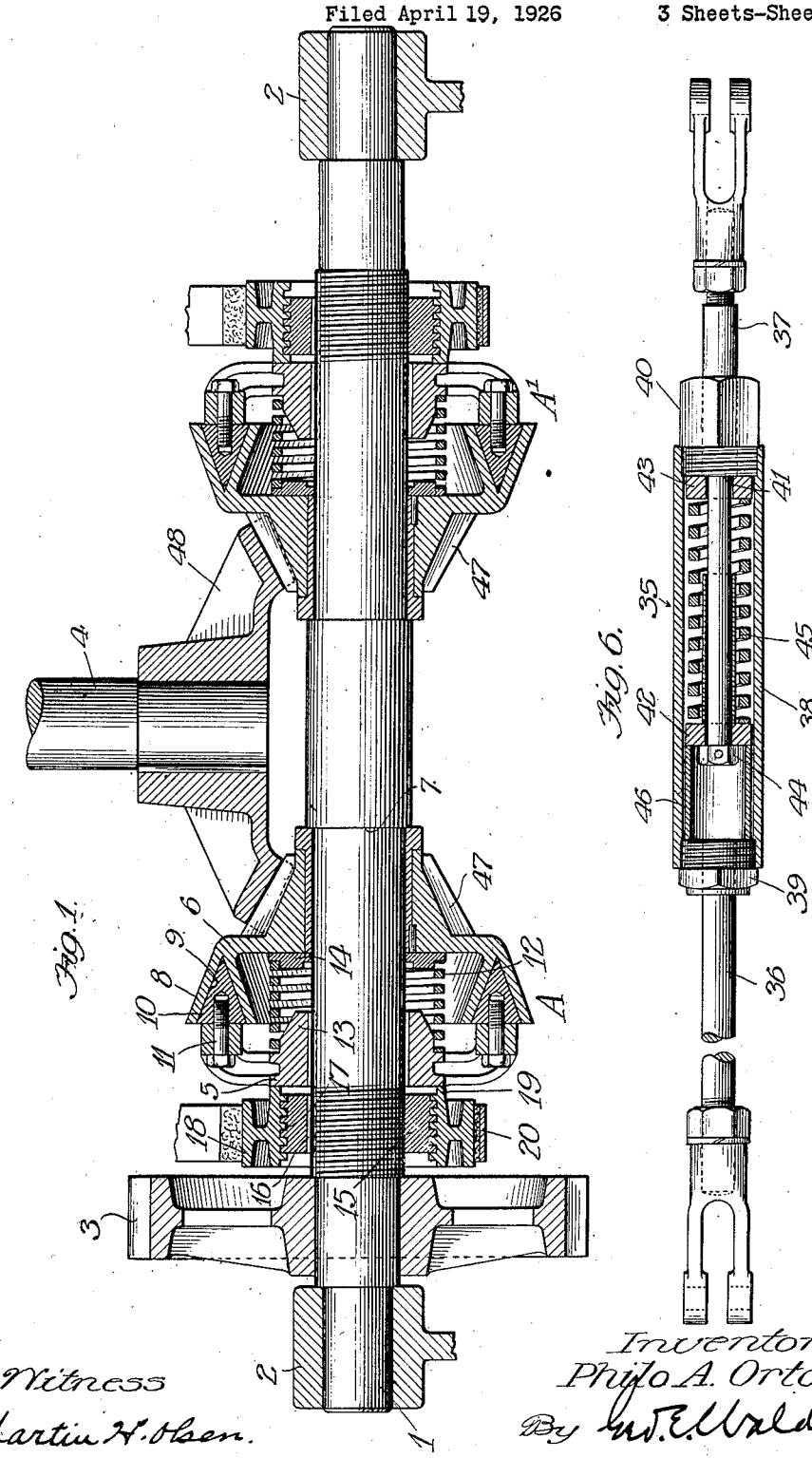

Oct. 16, 1928.
P. A. ORTON
1,688,129
FRICTION CLUTCH TRANSMISSION
Filed April 19, 1926   3 Sheets-Sheet 3
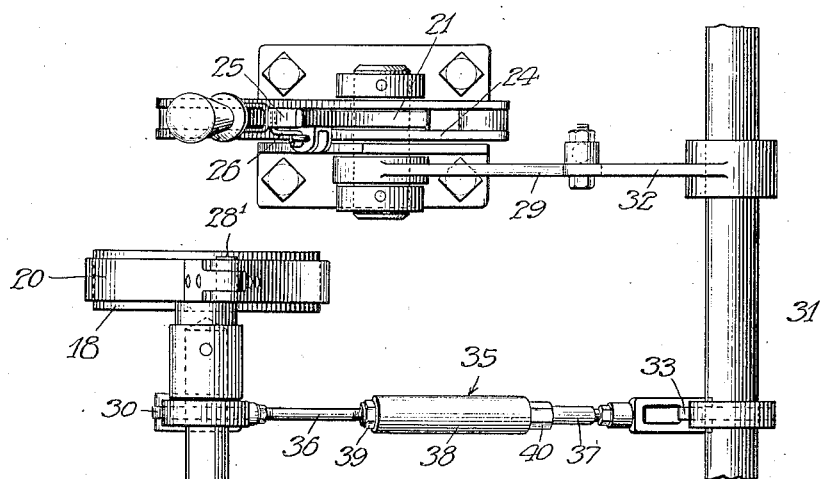
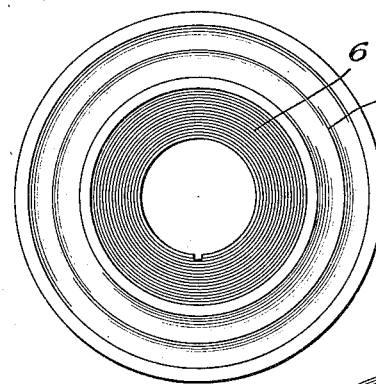
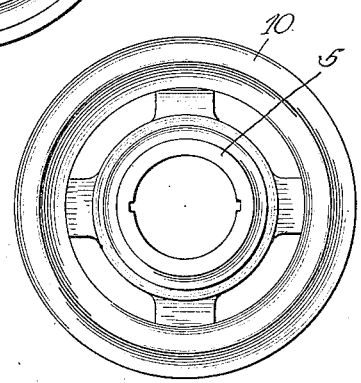
Witness
Martin H. Olsen
Inventor
Philo A. Orton
By Jno. E. Waldo
Atty.

Patented Oct. 16, 1928.

1,688,129

UNITED STATES PATENT OFFICE.

PHILO A. ORTON, OF CHICAGO, ILLINOIS, ASSIGNOR TO ORTON CRANE & SHOVEL CO., OF HUNTINGTON, INDIANA, A CORPORATION OF INDIANA.

FRICTION-CLUTCH TRANSMISSION.

Application filed April 19, 1926. Serial No. 102,980.

This invention relates to friction clutch transmissions and relates particularly to power-applied transmissions.

The object of the invention is to provide a power-applied friction clutch transmission which will be simple in construction, strong and durable, and effective for its designed purposes.

A further object of the invention is to provide a power-applied friction clutch transmission constructed and arranged for rotating a rotatable member driven by means thereof in opposite directions, and which is adapted to be operated by means of a single operating lever.

It is found in practice that when the clutch control and clutch transmission are thrown in with full force suddenly, it causes jolting and racking of the different parts of the mechanism and also of the machine to which the transmission is applied, which, as is generally well known, causes excessive wear in the machine and materially shortens the life thereof.

A further object of the invention is to overcome this objectionable feature by providing a power-applied friction clutch transmission, in which the clutch will be thrown in with an initially yielding resistance, which will finally become positive, thus, effectually preventing sudden stressing of the machine with its accompanying injurious effects.

To effect the foregoing objects, a friction clutch transmission embodying my invention and improvements comprises the various features, combinations of features and details of construction hereinafter described and claimed.

In the accompanying drawings, in which my invention is fully illustrated,

Figure 1 is a sectional elevation illustrating the friction clutch transmission of my invention shown as applied in use for imparting rotation to the rotatable member in opposite directions.

Figure 2 is an end elevation of the clutch shaft, showing in association therewith a preferred form of power-actuating means for operating the clutch or clutches on said shaft.

Figure 3 is a top plan view of said power-actuated clutch operating mechanism,

Figures 4 and 5 are, respectively, detached face views of the different clutch members; and Figure 6 is a sectional view of a spring-link forming part of the clutch-applying mechanism, whereby the application of said clutches may be cushioned.

Describing the invention with particular reference to the drawings, 1 designates a shaft rotatably mounted in bearings indicated at 2, to which rotation is adapted to be imparted from any suitable source of power, as by means of a gear-and-pinion transmission, comprising a gear 3 secured to said shaft so as to rotate therewith. For purposes of convenient reference, the shaft 1 will hereafter be referred to as the power-shaft.

Rotatably mounted in association with the power-shaft 1 is a rotatable member, to which rotation is adapted to be imparted by a friction clutch or transmission mounted on said power shaft. As shown, said rotatable member is a shaft 4, which may exemplify the slewing shaft of a crane or shovel, or other rotatable means.

In the preferable embodiment shown, two separate clutches designated, respectively, as a whole, A, A', are mounted on the shaft 1 at opposite sides of the shaft 4, or other rotatable member, and are geared thereto in a manner to provide for rotating said shaft or other rotatable member, in opposite directions, as may be desired.

The clutch transmissions A, A' are duplicates of each other and one description will therefore apply to both, and the accompanying description will, therefore, be in the singular.

Referring now particularly to Figure 1 of the drawings, in which my improved friction clutch transmission is shown in detail, the clutches proper comprise clutch members 5 and 6, of which the clutch member 5 is splined to the power shaft 1 so as to be movable endwise thereon, and the clutch member 6 is normally free to turn on said shaft, its movement away from the clutch member 5 being limited by means of a shoulder 7 on the shaft, against which a rigid part of said clutch member 6 bears.

The clutch member 6 comprises an enlarged rim portion 8, formed in which is a

V-groove 9 and secured to the clutch member 5 in position to engage the groove 9, is a shoe 10, said shoe being tapered to fit the V-groove 9 in the clutch member 6. Said shoe preferably is mounted on the rim of the clutch member 5 by bolts 11, which extend through holes in the rim of the clutch member 5 and have screw-threaded engagement with holes in the shoe 10.

A spring 12 is inserted between opposed faces of the clutch members 5 and 6, being confined in position by a hub 13 on the clutch member 5 and a collar 14 on the shaft 1, which bears against the clutch member 6. Said spring is made of sufficient strength to move the clutch member 5 endwise on the shaft 1 to disengage the shoe 10 from the groove 9, and thus to throw out the clutch, when said clutch member 5 is free to move.

My improved clutch is of the type in which movement is adapted to be imparted to the clutch member 5 to engage or throw in the clutch by manually controlled power means. As shown, said means are as follows: Formed on the power shaft 1 at the side of the clutch member 5, remote from the clutch member 6, is a screw 15, the means for securing said screw to said shaft preferably comprising screwthreads which engage said screw with said shaft and which support it against endwise movement thereon, and a key 16, which secures said screw to the said shaft against rotary motion.

Adjusted to the screw 15 and having screwthreaded engagement therewith, as shown at 17, is a brake-drum 18, the hub portion of which projects beyond the face of the screw adjacent to the clutch member 5, as shown at 19, and is adapted to contact with the hub portion 13 of said clutch member, the relation being such that when the brake-drum 18 is held against rotation, the screwthreads engaging said drum with the screw 15 will impart movement to said brake-drum endwise into contact with the clutch member 5 and force said clutch member endwise of the shaft 1 and against the force of the spring 12, to effect engagement of the shoe 10 thereon with the groove 9 in the clutch member 6, thus throwing in the clutch.

The screwthread 17, which engages said brake-drum 18 with the screw 15, is of such pitch that, when the brake-drum 18 is free to rotate, the force of the spring 12, acting on the projecting hub portion 19 of said brake-drum, through the clutch member 5, will turn said brake-drum in a direction the reverse of the direction of relative rotation of said brake-drum and screw when the brake-drum is held against rotation, thus imparting movement to said brake-drum on said screw in a direction away from the clutch member 5, permitting movement of said clutch member under the force of the spring 12 away from the clutch member 6, and effecting disengagement of the shoe 10 thereon from the groove 9 in the clutch member 6, thereby throwing out the clutch.

The means for holding the brake-drum against rotation when it is desired to throw in the clutch, consists of a brake-band 20 adjusted thereto, which is adapted to be applied to said brake-drum by means of suitable operating connections with a hand lever 21, which may be mounted in any convenient position for manipulation by an operator.

As shown, the lever 21 is adapted to be maintained in neutral position, corresponding to disengagement of the brake-band 20 from the brake-drum 18, by means of a spring-catch 22 mounted thereon, which is adapted to engage a notch 23 formed in a segment 24, mounted in fixed position adjacent to the pivoted end of the lever 21. Said catch is adapted to be manipulated by a usual hand lever 25 pivoted to the lever 21 in such a position that its free end will be in close proximity to the handle of the lever 21 and may be gripped by the hand of the operator when grasping the handle of the lever. The lever 25 is connected with the catch 22 by a connecting rod 26.

Describing the means for applying the brake-band 20 with particular reference to the clutch A, said means consists of a rock-shaft 27 (Figures 2 and 3) mounted adjacent to the power shaft 1. Both ends of the brake-band 20 are attached to a pin or stud 28 which projects at the end of said rock-shaft, said stud being eccentric to the axis of rotation of said rock-shaft, the relation being such that rotation of said rock-shaft in opposite directions will operate to apply and release said brake-band 20 from the brake-drum 18, the position of said stud, when in neutral position, being preferably such that its axis will intersect a right line through the axis of said rock-shaft, which extends substantially at right-angles to a right line connecting the axis of said rock-shaft with the axis of the powershaft.

The connection between the lever 21 and the rock-shaft 27 comprises lever arms 29 and 30, secured to rotate with said lever and rock-shaft, respectively, a pivot-shaft 31, arms 32 and 33, secured to said pivot-shaft and links 34 and 35, which connect the lever arms 29 and 32 and 30 and 33, respectively.

The link 34 is rigid, but, to provide for applying the brake-band 20 with a yielding resistance, the link 35 consists of overlapping members which are relatively movable endwise and are maintained normally in what may be referred to as neutral elongation—corresponding to neutral position of the operating lever 21 and disengagement of the brake-band 20—by a spring inserted between followers mounted on one member so as to be movable lengthwise thereof. Movement of said followers away from each other is limited by fixed stops on said member, thus limiting contraction of the link by said spring, the relation being preferably such that when said followers, respectively, are in contact with different stops on said link member, the operating lever 21 will be approximately in neutral position. The link member, other than that on which the followers are mounted, is also provided with fixed stops opposed, respectively, to the stops on the member on which said followers are mounted, adapted to limit movement of one or the other of said followers with the link member on which they are mounted when endwise movement is imparted to said link member, the relation being such that the spring inserted between said followers will be compressed by relative endwise movement of the link members either to elongate or compress said link 35.

Preferably, the relation will be such also that when the link members are in positions corresponding to neutral position of the operating lever 21, each follower will be in contact with its control stops on both link members, whereby lost motion in the link 35 will be prevented and movement of the operating lever in either direction from neutral position will operate to compress the spring confined between said followers.

In the preferable construction shown, (Fig. 6) the link 35 comprises rod sections 36 and 37, adapted to be connected, respectively, to the lever arms 30 and 33 (Fig. 2), and a cylinder 38. The rod section 36 is rigidly connected to the cylinder head 39 and the rod section 37 is fitted to an axial bearing in the cylinder head 40, so as to be freely movable endwise, the inner end of said rod section which extends into the cylinder 38, being reduced in size so as to form a shoulder 41 thereon. As shown, both cylinder heads 39 and 40 have screwthreaded engagement with the cylinder 38, the cylinder head 40 being of such length, that, in operation, the enlarged outer end of the rod section 37 will always be in engagement with its bearing in said cylinder head.

Mounted on the reduced portion of the rod section 37 are followers 42 and 43. The follower 42 is confined on the rod section 37 by a head 44 thereon, preferably formed by a nut threaded to the end thereof and pinned in desired adjustment thereto. Movement of the follower 43 on the rod section 37 away from the follower 42 is limited by the shoulder 41 on said rod section. The followers 42 and 43 are maintained normally at the limit of their movement away from each other by a spring 45 which, however, permits them to be advanced towards each other in operation.

Movement of the follower 42 with the rod section 37 is limited by a suitable stop on the cylinder 38, consisting, as shown, of a sleeve 46 inserted within said cylinder, the end of which bears against the cylinder head 39. In like manner, movement of the follower 43 away from the follower 42 is limited by a stop on the cylinder 38, consisting, as shown, of the cylinder head 40.

Movement of the followers 42 and 43 towards each other is limited by the spring 45, the relation being such that when the link members are in position corresponding to neutral position of the operating lever 21, the followers 42 and 43 will be maintained in contact with the stops 44 and 41, respectively, on the rod section 37 by the spring 45, which will be under very little, if any, tension.

Preferably, also, the stops on the cylinder formed by the cyliner head 40 and the sleeve 46, are so positioned that when the link members are in position corresponding to neutral position of the operating lever, the follower 42 will be in contact with the end of the stop sleeve 46 and the follower 43 will be in contact with the clinder head 40.

Relative movement of the members of the link 35 to compress the spring 45 is limited by a stop interposed between the followers 42 and 43, the relation being such that a yielding resistance will be produced in the initial application of the brake-band 20 during a predetermined relative movement of said link members, in the operation of throwing in the clutch, after which further approach of said followers towards each other will be prevented by said interposed stop, thus rendering the link 35 rigid and providing for applying the clutch positively. As shown, the stop for thus limiting the approach toward each other of said followers 42 and 43 is formed by the spring 45, which is so proportioned that when the followers 42 and 43 have been advanced towards each other into predetermined positions, the spirals of the spring 45 will be brought into contact with each other, thus preventing further compression of said spring and further approach of said followers 42 and 43 towards each other, thereby rendering the link 35 rigid and its action positive, in the manner desired.

With the construction described, it is obvious that pivotal movement of the operating lever 21 to the left (Fig. 2) will rotate the rock-shaft 27 to apply the brake band 20 of the clutch A, and that, in the application of said brake band, the force applied to the operating lever, acting against the resistance of the brake band, will compress the spring 45, thus forcing the rod section 37 into the cylinder 38, shortening the link 35 and advancing the follower 43 towards the follower 42, inward movement of said rod section and shortening of said link being limited by contact of the spirals of the spring 45.

When—as in the present case—my improved transmission comprises two clutches, the brake-band for operating the second clutch A', is adapted to be applied through the rock-shaft 27 and its connections with the operating lever 21.

The means for applying the brake-band 20 which controls the clutch A' is substantially a duplicate of the means for applying the brake-band 20 which controls the clutch A, consisting of a stud 28' which projects at the opposite end of the rock-shaft 27 from the stud 28 and which is eccentric to the axis of rotation of said rock-shaft and is positioned at an angle of substantially 180 degrees from the stud 28, that is, said studs are diametrically opposite to each other.

With this relation, it is obvious that pivotal movement of the operating lever 21 to the right (Fig. 2) will rotate the rock shaft 27 to apply the brake band 20 of said clutch A', the force applied to the operating lever, acting against the resistance of said brake band operating to compress the spring 45, thus withdrawing the rod section 37 from the cylinder 38 and advancing the follower 42, which rests against the nut 44 secured to the end of said rod section, towards the follower 43 which rests in contact with the inner end of the cylinder head 40 and is held against movement with said rod section, thus elongating the link 35, compression of said spring and elongation of said link being limited by contact of the spirals of said spring, in the same manner as occurs when the clutch A is thrown in, thus applying the brake band 20 of the clutch A' with an initial yielding and a final positive force.

With the described construction, it is obvious that rotation of the rock-shaft 27 to apply the brake-band which controls either clutch, will also operate to release the brake-band which controls the other clutch. It is also obvious that the link 35 will act in compression to apply the brake-band which controls the clutch A and will act in tension to apply the brake-band which controls the clutch A', while the spring 45 will act in compression in both cases.

The shaft 4 is adapted to be rotated in opposite directions by suitable driving connections with the clutches A, A'.

As shown, said driving connections consist of bevel gears, comprising pinions 47 secured to rotate with the clutch members 6 and a gear 48 on the shaft 4, which meshes with both pinions 47.

With the described construction, it is obvious that, by applying one or the other of the brake-bands 20, the shaft 4 may be rotated in opposite directions and, also, that only one of said clutches can be thrown into engagement at the same time, due to the fact that rotation of the rock-shaft 27 to apply one brake, will at the same time release the other.

I claim,—

1. In a friction clutch transmission of the type specified, the combination of a shaft, means for rotating said shaft, a rotatable member, a friction clutch on said shaft comprising members, one normally loose thereon and the other splined thereto, means for operating said clutch comprising a thrust member having screw-threaded engagement with said shaft, a brake-drum on said thrust member, a brake-band adjusted thereto, manually controlled means for applying said brake-band, and a driving connection between said loose clutch member and said rotatable member.

2. A friction clutch transmission as specified in claim 1, in which the means for applying the brake-band is yielding.

3. A friction clutch transmission as specified in claim 1, in which the thrust member has a bore which has screw-threaded engagement with the clutch shaft.

4. A friction clutch transmission as specified in claim 1, in which the means for applying the brake-band is initially yielding and becomes rigid under stress.

5. A friction clutch transmission as specified in claim 1 in which the means for applying the brake-band comprises a link consisting of overlapping sections which are relatively movable endwise, and a spring interposed between rigid parts of said link members rendering said link yielding under stress.

6. A friction clutch transmission as specified in claim 1, in which the means for applying the brake-band comprises a rock-shaft, a stud which projects from an end thereof eccentric to its axis of rotation, to which an end of the brake-band is connected, an operating lever and connection between said lever and rock-shaft for rotating said shaft.

7. A friction clutch transmission as specified in claim 1, in which the means for applying the brake-band comprises a rock-shaft, a stud which projects from an end thereof eccentric to its axis of rotation, to which an end of the brake-band is connected, an operating lever and a connection between said lever and rock-shaft for rotating said shaft, comprising a yielding member.

8. In a friction clutch transmission the combination of a shaft, means for rotating said shaft, a rotatable member, a friction clutch on said shaft comprising members, one normally loose thereon and the other splined thereto, thrust means applied to said splined clutch member for imparting movement thereto to effect engagement of said clutch, comprising a screw on said shaft, a brake-drum provided with a bore having threaded engagement with said screw and normally free to rotate therewith, a brake-band, means for applying said brake-band, said brake-drum and the clutch member splined to said shaft being provided with opposed thrust surfaces, the relation being such that when the brake-band is applied, movement will be imparted to said brake-drum endwise on said screw and through it to the splined clutch member to engage the clutch, means for retracting said thrust member when the brake-band is released and for disengaging said clutch, and driving connection between said loose clutch member and said rotatable member.

In witness that I claim the foregoing as my invention, I affix my signature this 15th day of April, 1926.

PHILO A. ORTON.